United States Patent [19]
Moe

[11] Patent Number: 5,969,275
[45] Date of Patent: Oct. 19, 1999

[54] PROBE WITH REPLACEABLE CENTERING FEET

[75] Inventor: Jason T. Moe, Redmond, Wash.

[73] Assignee: Zetec, Inc., Issaquah, Wash.

[21] Appl. No.: 09/093,420

[22] Filed: Jun. 8, 1998

[51] Int. Cl.[6] .................................................... G01B 5/12
[52] U.S. Cl. ............................................................. 73/866.5
[58] Field of Search ................................. 73/865.8, 866.5; 324/220, 221, 228, 240–243; 33/DIG. 13

[56] References Cited

U.S. PATENT DOCUMENTS

| | | | |
|---|---|---|---|
| 3,363,170 | 1/1968 | Gieske | 73/866.5 |
| 4,851,773 | 7/1989 | Rothstein | 324/220 |
| 4,910,877 | 3/1990 | Sokol | 33/DIG. 13 |
| 4,981,044 | 1/1991 | Adams et al. | 73/623 |
| 5,329,824 | 7/1994 | Carapezza et al. | 73/866.5 |

FOREIGN PATENT DOCUMENTS

| | | | |
|---|---|---|---|
| 2626060 | 3/1977 | Germany | 324/220 |
| 0085248 | 6/1980 | Japan | 324/220 |

*Primary Examiner*—Robert Raevis
*Attorney, Agent, or Firm*—David L. Tingey

[57] ABSTRACT

An eddy current probe with a probe body having at least one eddy current coil is centered on a probe shaft by a pod with a plurality of replaceable centering feet which allows abraded centering feet to be replaced while the balance of the probe is retained and reused. Typically, the probe body is sandwiched between a pair of such centering pods. The replaceable pods comprise matching halves, divided longitudinally, that fit together over the shaft. Each of the centering pods is retained against the body probe by means of a retaining cap threaded on the probe shaft against the joined pod halves urging the pod against the probe body. The pod extends into an annular trepan in the probe body to secure the pods at that end. A face within the retaining cap normal to the shaft or slanted acutely toward the probe and overhanging the pod retains the pod in position around the shaft at the retaining cap end.

14 Claims, 4 Drawing Sheets

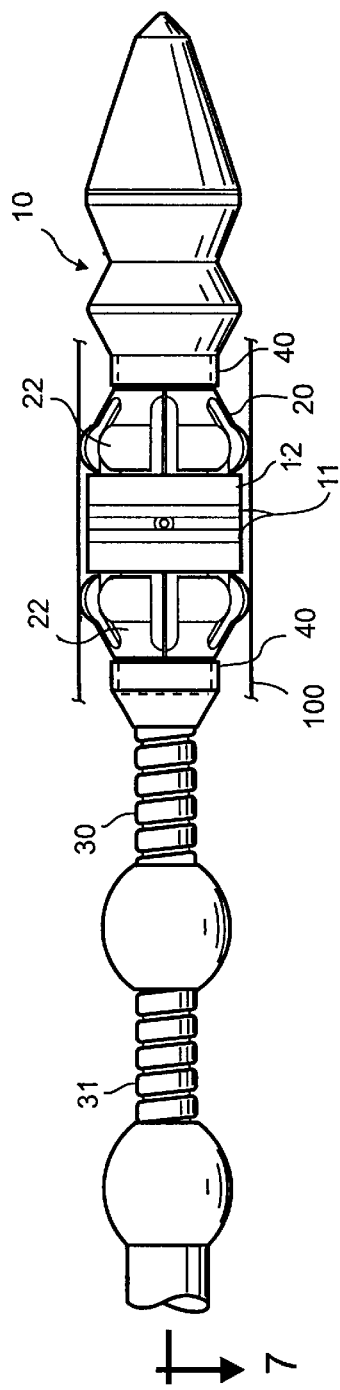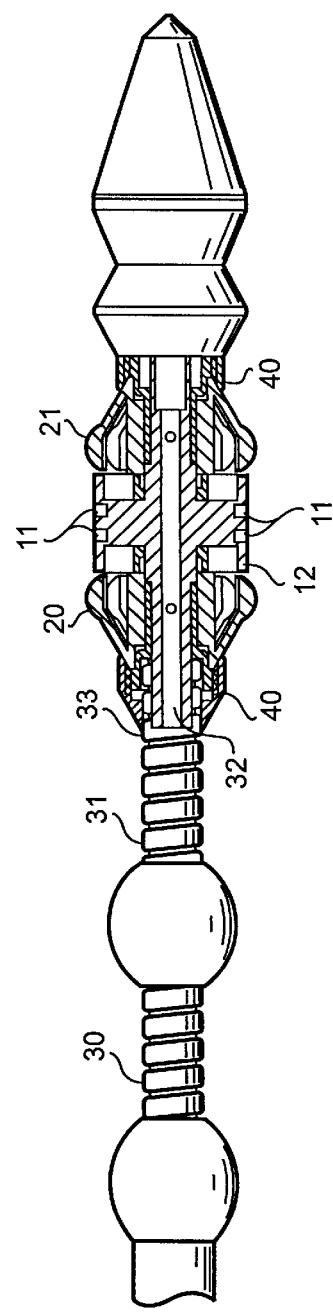

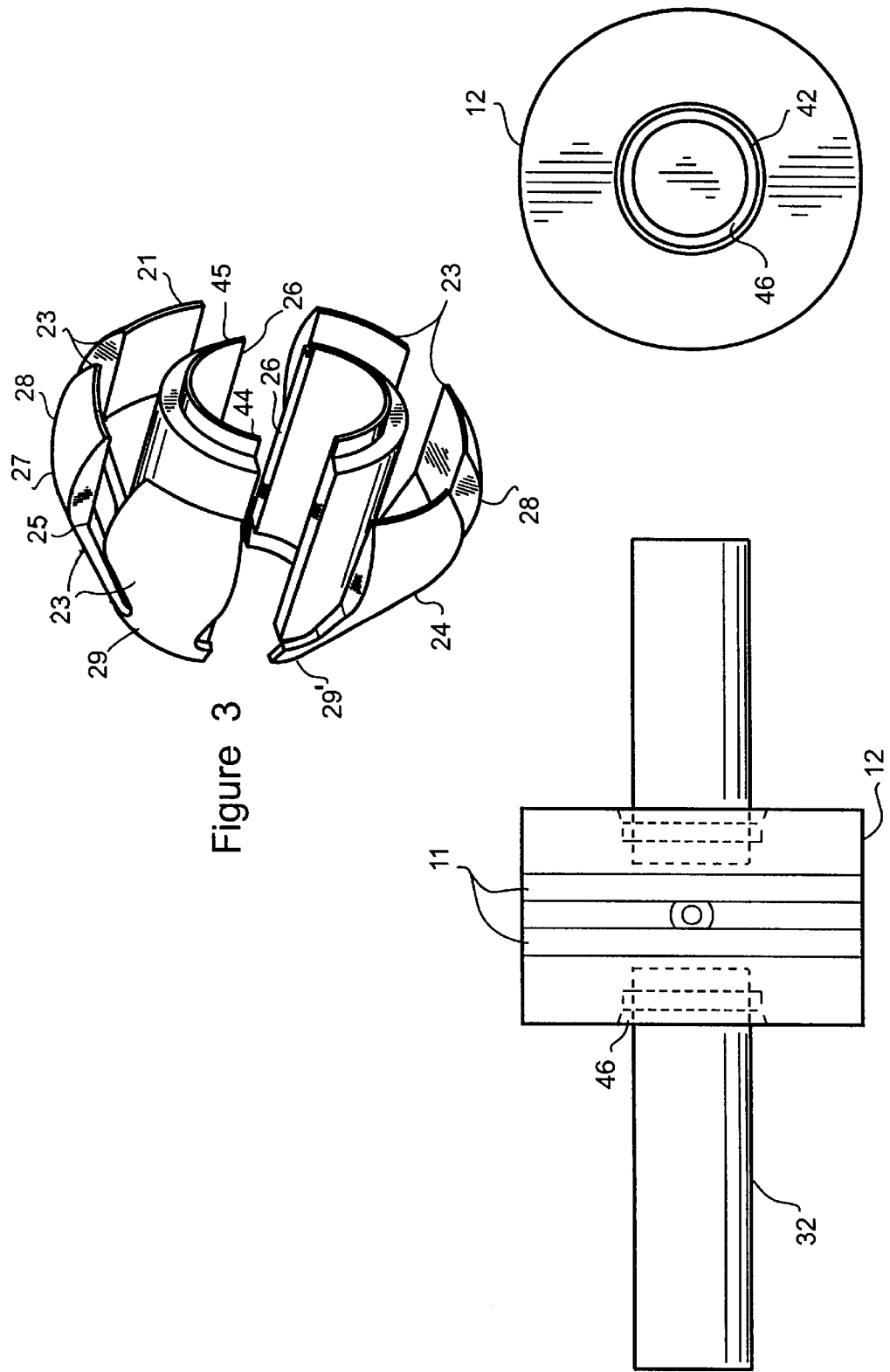

5,969,275

PROBE WITH REPLACEABLE CENTERING FEET

BACKGROUND

1. Field of the Invention

This invention relates to nondestructive testing apparatus, more particularly, to a measuring probe used to inspect tubular members and passageways.

2. Prior Art

It is known in the art to have remote sensors, or probes, traveling in tubular members, such as are found in steam generators and heat exchangers, to inspect the integrity of such tubes and conduits when human access is restricted. Generally, a testing probe is delivered internal the conduits by means of a positioning shaft to which it is attached. As the shaft impels the probe into the conduit, the probe measures the host conduit along its length, or longitudinally, transmitting probe measurement data out of the conduit through cables carried in a duct within the shaft. An eddy current probe is one such remote sensor commonly employed in the inspection of conduits.

Eddy current probes operate by coils alternating an electromagnet field into a conduit as it travels within the conduit and receiving electromagnetic returns from the conduit. In interacting with the conduit structure, the field is able to locate defects by recognizing anomalies, such as disbonds, bubbles, cracks, corrosion, delaminations, thickness variation, and the like.

At least one eddy current test coil is commonly mounted circumferentially around the probe. In this configuration, it is required that the probe be aligned centrally on the conduit axis to insure a viable and reproducible measurement. It is known to have resilient centering feet about the eddy current coils located in a probe body to achieve the desired axial position of the probe test coils. As the probe travels through the conduit, the probe rides on the centering feet that slide along the conduit inner surface, thus directing the probe and assuring a constant distance of the coils from the conduit. In this operational mode, the sliding centering feet become abraded through repeated use.

To the degree they are abraded, the eddy current probe is off center and produces a degraded measurement. After a period of use the probe becomes unreliable and therefore unusable due to the abraded centering feet; the entire probe must be discarded even while the balance of the probe is fully usable. With the considerable use, complexity and expense of eddy current probes, it is desirable to have an eddy current probe that does not need to be fully discarded when its centering feet become abraded.

It is thus the object of the present invention to provide an eddy current probe with replaceable centering feet.

SUMMARY

The objects of the invention are achieved in an eddy current probe comprising a center shaft on which is secured a probe body sandwiched between removable pods with body-centering feet. The pods comprise matching halves divided longitudinally that fit together over the shaft. Each of the centering pods is retained against the probe body by means of a retaining cap threaded on the probe shaft against the joined pod halves urging the pod against the probe body and unthreaded to release the pod halves from the shaft. The pod extends into an annular trepan in the probe body to secure the pods at that end. A flat face within the retaining cap normal to the shaft or slanted acutely toward the probe and overhanging the pod retains the pod in position around the shaft at the retaining cap end.

The probe is used until the centering feet become abraded but before the abraded feet compromise their function of reliably centering the probe body in the tube. The centering feet on both sides of the probe body are then replaced by retracting the retaining cap, removing each pod by separating pod matching halves, and replacing them around the shaft with pods that have new, unabraded centering feet. The slidable retaining cap is then secured to the pod, urging the pod against the probe body. Thus, the worn centering feet are replaced while retaining the balance of the probe without compromising the reliability of the probe.

BRIEF DESCRIPTION OF THE DRAWINGS

FIG. 1 is a side view of the probe with replaceable centering feet showing the probe operational with the probe body sandwiched between two pods having resilient cantilevered feet.

FIG. 3 is a perspective view of a typical centering foot.

FIG. 4 is a side view with a corresponding end view of the probe body with trepans for receiving ends of the centering feet.

FIG. 7 is a cross-sectional view of the probe of FIG. 1 taken along the line 7—7.

DETAILED DESCRIPTION OF THE PREFERRED EMBODIMENT

Figure 2:
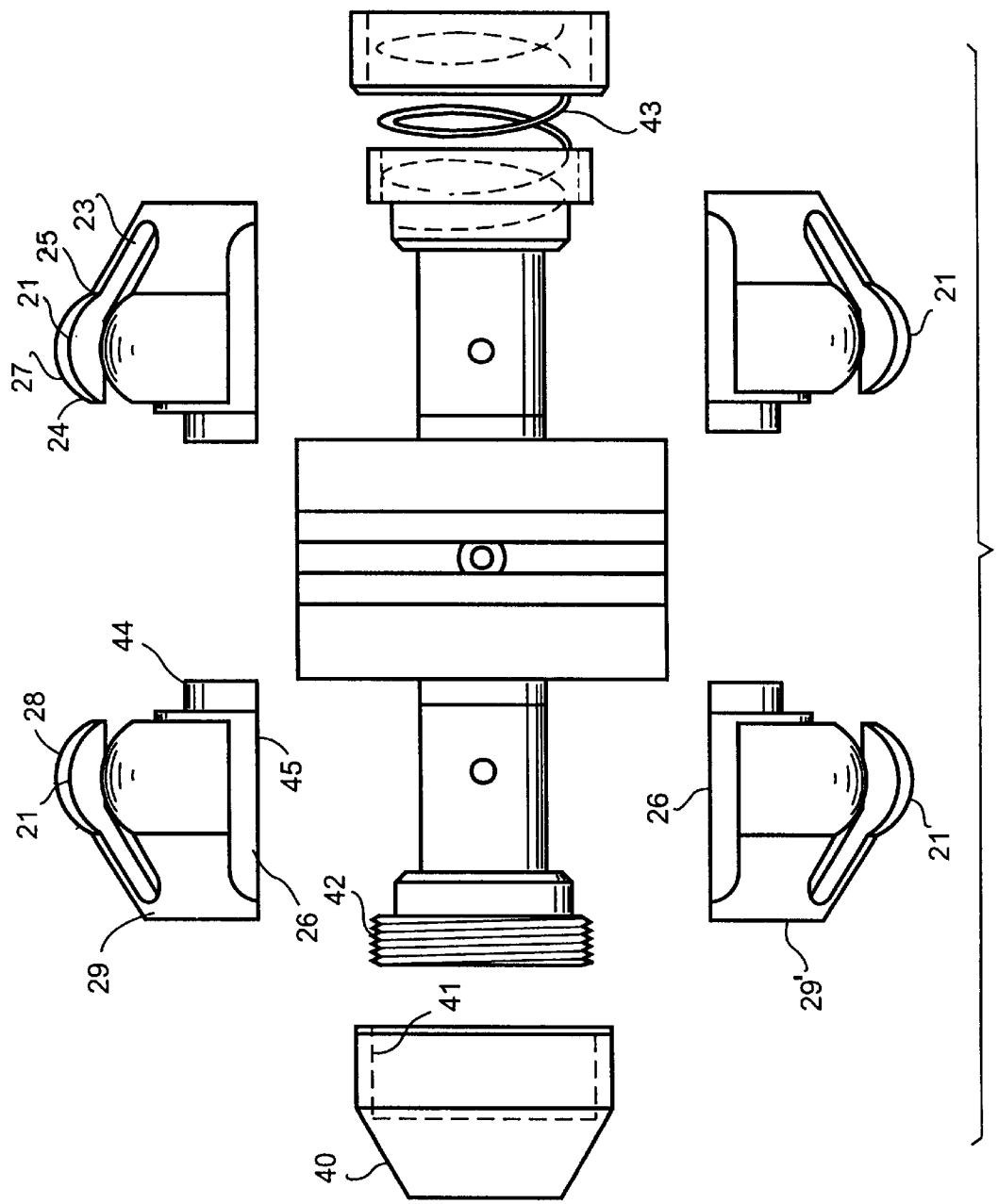
FIG. 2 is an exploded view showing the slidable retaining cap retracted and pod halves separated from a probe shaft.
Figure 6:
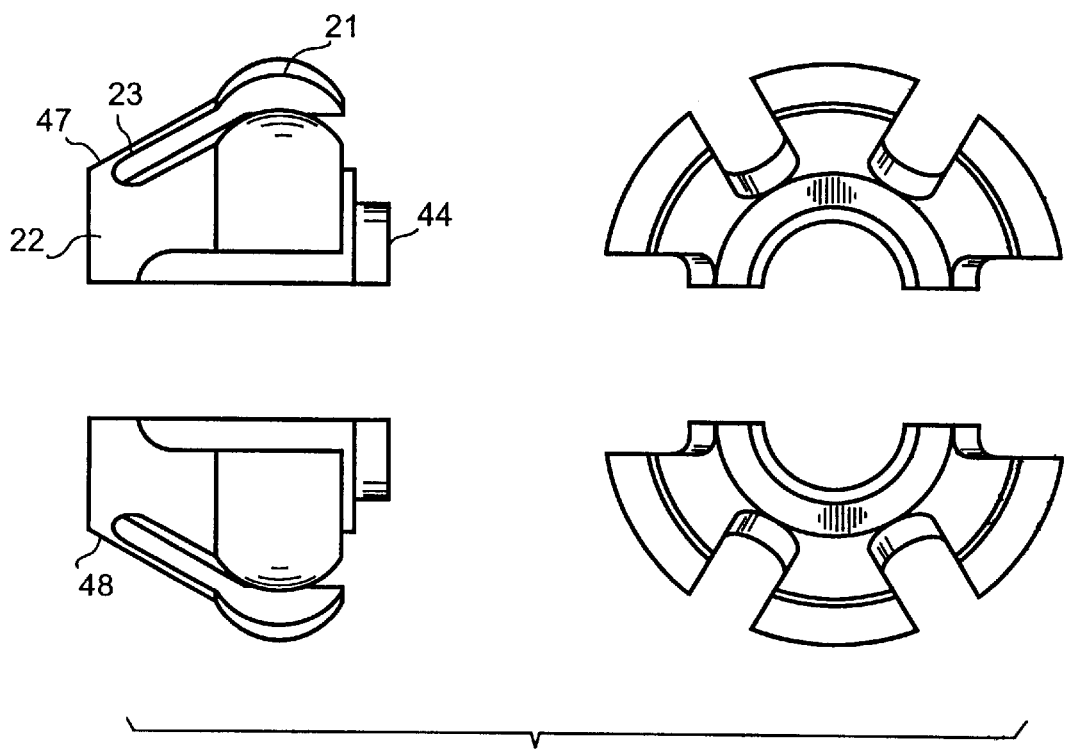
FIG. 6 is a side and an end view of a typical pod.
Figure 5A:
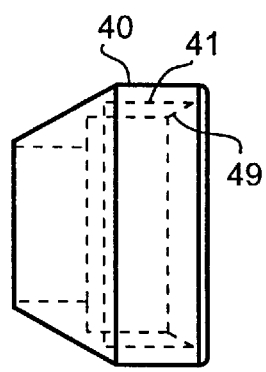
FIG. 5a and FIG. 5b are side views of alternate embodiments of the retaining cap.
Figure 5B:
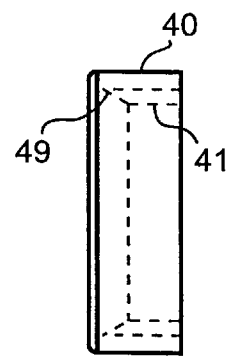

Referring to the figures, the present invention comprises an eddy current probe 10 that includes at least one eddy current coil 11 in a probe body 12 as a transducer disposed to project and detect an alternating electromagnetic field and a probe-centering apparatus 20 having replaceable centering feet 21 for centering the probe body traveling in a tube 100. The probe-centering apparatus 20 comprises a tubular shaft 30 as a conduit for cabling within and as a carrier of said eddy current probe. The shaft comprises an extended flexible drive section 30 and a rigid section 31 at its distal end 33 to which the eddy current probe with the probe body and centering apparatus is attached. Typically, the probe body 21 is secured on the shaft sandwiched between a pair of removable pods 22 against the probe body 12, adapted to maintain the probe body central in the tube 100.

A plurality of resilient cantilevered legs 23 each having a centering foot 24 on a leg distal end 25 extend acutely from a pod cylindrical section 26 sized to fit around the shaft. The centering feet 24 typically include a curvilinear outer surface 27 with a central portion 28 extending beyond the probe body 12. The centering feet 24 on the respective legs 23 extend from the shaft 30 outwardly beyond the probe body 12 such that the centering feet 24, spaced circumferentially around the shaft, and not the probe body, slidably contact the tube 100 in which the probe travels holding the probe body away from the tube walls centrally within the tube.

The pod 22 comprises two matching halves 29, 29' dividing the cylindrical section 26 into equal half cylinders that are removably secured around the shaft. A retaining cap 40, with a hole therethrough, biased toward the probe body slides over the shaft, the shaft passing through the hole, and removably secures the pod 22 against the probe body.

Typically, the cap 40 has internal threads 41 matching shaft threads 42 adapted to secure the cap on the shaft against the pod halves. Alternatively, the cap 40 may be spring-biased against the pods with a spring 43 secured between the shaft and the cap. It is to be understood that any of several other optional means of equivalently securing the cap to the pod in retaining the pod in place shall be deemed included as a part of the invention.

The cylindrical section 26 includes a body-end member 44 extending longitudinally past the centering feet 24 at a pod probe body end 45 and into a trepan 46 within the probe body 12 at the shaft to secure the pod at its probe body end in place against the shaft.

The pod cantilevered legs 23 when extending from the cylindrical section 26 at its retaining cap end 47 present a conical surface 48. Typically, the retaining cap includes an overhanging portion 49 forming a cylindrical cavity matching the pod conical surface that extends toward the pod into which the conical surface is captured, thus securing and aligning the pod on the shaft at the retaining cap as the body-end member in the probe body trepan secured the pod at the body end.

To replace centering feet as they become abraded through use, the retaining cap is retracted from the pod, and the pod halves are removed out of the probe body trepan and separated from the shaft. The pod is replaced with new pod halves with unabraded foot sections by placing the pod halves together over the shaft and into the trepan. The retaining cap is then returned against the new pod urging the pod securely against the probe body.

In an alternative embodiment, the retaining cap may be biased on the shaft toward the body portion by means of a spring attached between the shaft and the cap. Under spring bias, the cap is urged against the pod conical surface, thus securing the pod to the probe body. To remove the pod, the cap is moved further against the spring bias, away from the pod so the pod can be extracted from its position on the shaft.

I claim:

1. An apparatus disposed to center a probe body traveling in a tube, the improvement comprising
    a shaft with said probe body secured thereon,
    a replaceable pod insertable on the shaft and adapted to center the shaft and probe body in said tube, the pod comprising two matching pod halves joining around the shaft and together combining to form a cylinder around the shaft, said god being removable from the shaft radially by separating upon release from the shaft into said pod halves,
    means for removably securing the pod on the shaft.

2. The apparatus of claim 1 in which the pod further comprises a plurality of cantilevered legs about the shaft, each with a centering foot on respective leg distal ends extending outwardly therefrom beyond the probe body, together comprising a plurality of centering feet spaced about the periphery of the shaft.

3. The apparatus of claim 2 in which the pod further comprises
    a cylindrical section adapted to fit over the shaft having a body end proximal the probe body,
    said plurality of resilient cantilevered legs extending acutely outward from the cylindrical section, and
    a pod body-end member extending longitudinally past the centering feet and into a trepan within the probe body at the shaft to secure the pod at its probe body end in place against the shaft.

4. The apparatus of claim 3 in which the legs extend from a cylindrical section end opposite the body end and extend longitudinally toward the probe body and terminate such that the feet do not contact the probe body.

5. The apparatus of claim 1 wherein said means for removably securing the pod on the shaft comprises
    a retaining cap with a hole through which the shaft may pass and slidable over the shaft into abutment with the pod and adapted to removably secure said pod against the probe body,
    means for retractably securing the retaining cap on the shaft.

6. The apparatus of claim 5 in which the shaft includes
    a portion threaded about its circumference, and
    said retaining cap further comprising threads matching the shaft threaded portion adapted such that the retaining cap when threaded onto the shaft threaded portion secures the pod the shaft between the threaded portion and the probe body.

7. The apparatus of claim 5 in which the retaining cap further comprises an overhanging portion extending longitudinally toward the pod forming a cylindrical cavity into which a portion of the pod is captured, thus aligning the pod on the shaft at the retaining cap.

8. The apparatus of claim 7 in which the overhanging portion is tapered to match the pod such that the retaining cap makes consistent centering contact with the pod around the shaft.

9. The apparatus of claim 1 comprising
    a first said pod on a first side of said probe body, and
    a second said pod on a second side of said probe body opposite the probe body first side, the probe body thus sandwiched between the two pods.

10. The apparatus of claim 1 in which the pod is removably insertable over the shaft and against a first side of said probe body.

11. A combination comprising
    a. an eddy current probe comprising at least one eddy current coil as a transducer disposed to project and detect an alternating electromagnetic field, and
    b. the apparatus of claim 1 for centering said probe body on said shaft rigid section wherein the shaft comprises a tubular shaft as a conduit for cabling within and as a carrier of said eddy current probe, the shaft further comprising a rigid section at its distal end to which the eddy current probe is attached and wherein said eddy current probe further comprises said probe body.

12. The combination of claim 11 wherein said pod comprises
    a plurality of centering feet about the shaft extending outwardly beyond the probe body and adapted to center the shaft and probe body in said tube.

13. The combination of claim 11 wherein said pod comprises
    two matching pod halves removably joining around the shaft, the pod halves together comprising
        a cylindrical section adapted to fit around the shaft,
        a plurality of resilient cantilevered legs extending outward from the cylindrical section with each leg having one of said plurality of centering feet on a leg distal end, and
    a retaining cap retractable over the center shaft adapted to removably secure said pod halves on the shaft against the probe body.

14. An apparatus for centering a probe body secured on a shaft traveling in a tube, the improvement comprising
- a first pod on the shaft against a first side of said probe body, the pod including a plurality of centering feet about the shaft beyond the probe body adapted to center the shaft and probe body in said tube, and
- a second pod on the shaft against a second side of said probe body opposite the probe body first side on the shaft, the second pod similarly including a plurality of centering feet about the shaft beyond the probe body adapted to center the shaft and probe body in said tube, wherein each of said pods comprises
- two matching pod halves removably joining around the shaft, the pod halves together comprising
  - a cylindrical section adapted to fit around the shaft,
  - a plurality of resilient cantilevered legs extending outward from the cylindrical section with each leg having one of said plurality of centering feet on an leg distal end, and
- a retaining cap retractable over the center shaft adapted to removably secure said pod halves on the shaft against the probe body.

* * * * *